United States Patent
Rosania et al.

(10) Patent No.: US 6,794,431 B1
(45) Date of Patent: Sep. 21, 2004

(54) NEAR INFRARED ELECTROMAGNETIC RADIATION ABSORBING COMPOSITION AND METHOD OF USE

(75) Inventors: Robert A. Rosania, Schwenksville, PA (US); Otto Gellner, Gillette, NJ (US)

(73) Assignee: Veil Corporation, Plymouth Meeting, PA (US)

( * ) Notice: Subject to any disclaimer, the term of this patent is extended or adjusted under 35 U.S.C. 154(b) by 0 days.

(21) Appl. No.: 09/641,745

(22) Filed: Aug. 18, 2000

(51) Int. Cl.$^7$ .................................................. C08L 1/02
(52) U.S. Cl. .................. 524/35; 524/261; 524/262; 524/264; 524/361; 524/376; 524/379; 524/481; 524/588; 524/589
(58) Field of Search ................ 524/261, 262, 524/264, 35, 361, 376, 379, 481, 543, 547, 558, 555, 570, 583, 589, 600, 601, 602; 526/311, 312, 318.42, 320, 328.5, 329.7

(56) References Cited

U.S. PATENT DOCUMENTS

| | | | | |
|---|---|---|---|---|
| 3,298,898 A | * | 1/1967 | Gall ........................... | 428/437 |
| 3,324,055 A | * | 6/1967 | Marks ......................... | 527/314 |
| 3,440,257 A | | 4/1969 | Susi et al. | |
| 3,502,871 A | * | 3/1970 | Marx, Jr. et al. ........... | 430/201 |
| 3,810,777 A | * | 5/1974 | Boebel et al. .............. | 427/160 |
| 3,876,587 A | * | 4/1975 | Matsui et al. ............. | 525/327.3 |
| 3,957,710 A | * | 5/1976 | Rohmann et al. .......... | 427/391 |
| 4,310,596 A | * | 1/1982 | Van Buskirk ............... | 428/336 |
| 4,425,161 A | | 1/1984 | Shibahashi et al. | |
| 4,606,848 A | | 8/1986 | Bond | |
| 4,839,414 A | | 6/1989 | Bederke et al. | |
| 5,154,759 A | | 10/1992 | Cifuentes et al. | |
| 5,271,872 A | | 12/1993 | Sallavanti et al. | |
| 5,501,724 A | | 3/1996 | Loff | |
| 5,553,714 A | * | 9/1996 | Cushman et al. ............. | 524/87 |
| 5,622,547 A | * | 4/1997 | Maslowski et al. ...... | 106/31.32 |
| 5,686,639 A | | 11/1997 | Cohen | |
| 5,741,823 A | | 4/1998 | Hsu | |
| 5,788,914 A | | 8/1998 | Oi et al. | |
| 5,919,601 A | * | 7/1999 | Nguyen et al. ............. | 430/176 |
| 5,998,535 A | * | 12/1999 | Haldankar .................. | 524/555 |
| 6,051,361 A | | 4/2000 | Hattori et al. | |
| 6,060,217 A | | 5/2000 | Nguyen et al. | |
| 6,136,425 A | | 10/2000 | Akiyama et al. | |
| 6,261,740 B1 | | 7/2001 | Nguyen et al. | |

FOREIGN PATENT DOCUMENTS

| | | | |
|---|---|---|---|
| JP | 404320466 A | * | 11/1992 |
| JP | 407267683 A | * | 10/1995 |

* cited by examiner

*Primary Examiner*—Judy M. Reddick
(74) *Attorney, Agent, or Firm*—Akin Gump Strauss Hauer & Feld, LLP (57) ABSTRACT

The present invention relates to liquid coating compositions that absorb near infrared electromagnetic radiation. The coating compositions include a near infrared absorbing agent, a carrier vehicle, and a solvent system. The invention is also directed to a method of reducing the reflection of near infrared radiation from a surface in which a liquid coating composition comprising a near infrared absorbing agent, a carrier vehicle, and a solvent system is applied to the surface and the solvent system is removed, leaving a coating with a thickness of about 0.25 mils to 2 mils. The present invention further relates to a surface having a coating comprised of a near infrared absorbing compound and a carrier vehicle.

17 Claims, 5 Drawing Sheets

NEAR INFRARED ELECTROMAGNETIC RADIATION ABSORBING COMPOSITION AND METHOD OF USE

BACKGROUND OF THE INVENTION

It is well known that the heat from electromagnetic radiation with a wavelength in the range of about 0.7 microns to about 5 microns, the near infrared spectrum, can have debilitating effects on many substrates. Damage and deterioration, such as cracking, can develop when a substrate is unprotected. This type of radiation can also cause damage to the eye. There are many sources of electromagnetic radiation in this range of the spectrum The sun is a major source of near infrared electromagnetic radiation, however, other sources include tungsten filaments, fluorescent lamps, welding arcs, and laser light.

Compounds that absorb near infrared (NIR) electromagnetic radiation are also well known in the art. Aminium and diimmunonium salts are examples of such compounds and are described in U.S. Pat. Nos. 3,440,257 and 5,686,639, the contents of which are incorporated herein by reference. These types of infrared absorbing compounds can be regarded as similar in that they strongly absorb energy in the NIR portion of the spectrum, yet they transmit light in the visible portion of the spectrum (0.4 microns to 0.7 microns). Because of these properties, U.S. Pat. No. 3,440,257 teaches incorporating its NIR absorbing compounds into plastics for use in sunglasses, welding goggles, laser protection eyewear, and other products that shield the eye from the harmfull effects of NIR radiation. These types of compounds can also be incorporated into other plastics to protect inanimate objects from hazardous NIR radiation, such as in projection lenses or television filters.

Wax and polish compositions have also been developed which contain compounds that absorb NIR radiation or other electromagnetic radiation, such as microwaves and radio waves. These waxes and polishes can be used to provide a protective layer to painted surfaces, such as automobile body parts, to attenuate the cracking and fading effects NIR radiation can have on such surfaces. Waxes and polishes containing NIR radiation absorbing compounds have also been used for other purposes such as to defeat near infrared laser detection mechanisms by absorbing and diminishing the reflection of NIR radiation.

However, waxes and polishes have drawbacks. Waxes and polishes often wash away easily after only short-term exposure to wet weather conditions. Most wax and polish compositions will provide an extremely thin coating which will often necessitate reapplication in order to provide greater absorbency. However, such reapplication of wax or polish coatings is usually not successful in achieving the necessary absorbency. Furthermore, polishes can be messy and waxes require rubbing and buffing, making application time consuming in most instances.

Thus, there exists a need in the art for a relatively inexpensive, easy to apply, weather-resistant, electromagnetic radiation absorbing coating composition which exhibits good absorbency of NIR radiation and yet still transmits a substantial portion of visible light.

BRIEF SUMMARY OF THE INVENTION

The present invention relates to compositions, useful as coatings, which contain a near infrared (NIR) electromagnetic radiation absorbing agent. More particularly, the present invention relates to liquid compositions, containing an NIR absorbing agent, which can be applied to a surface as a roughly uniform coating having a particular thickness for the purpose of absorbing NIR electromagnetic radiation.

The present invention provides a relatively inexpensive coating composition which exhibits a high degree of NIR absorption, a high degree of visible light transmittance, and is both easy to apply and weather-resistant.

The invention includes a liquid composition for coating surfaces which comprises a near infrared absorbing agent present in an amount of about 0.01% to about 2% by weight, a carrier vehicle present in an amount of about 20% to about 60% by weight, and a solvent system present in an amount of about 40% to about 80% by weight, each based upon the total weight of the composition.

The invention also includes a liquid composition for coating surfaces comprising (a) a near infrared absorbing agent selected from the group consisting of compounds of the formula (I):

$$[(R_2NZ)_2N\!=\!Z'\!=\!NR_2]^{2+}2X^- \qquad (I)$$

wherein R is an alkyl group of about 1 to about 6 carbon atoms; Z is a divalent phenyl which may or may not be ring substituted with one or more alkyl alkoxy, halogen, nitro, cyano, and carboalkoxy groups; Z' is a quinoidal phenyl which may or may not be ring substituted with one or more alkyl, alkoxy, halogen, nitro, cyano, and carboalkoxy groups; and X is an anion of a strong acid, and compounds of the formula (II):

$$[(R_2NZ)_3N]^+ + X^- \qquad (II)$$

wherein R is an alkyl group of about 1 to about 6 carbon atoms; Z is a divalent phenyl which may or may not be ring substituted with one or more alkyl, alkoxy, halogen, nitro, cyano, and carboalkoxy groups; and X is an anion of a strong acid; (b) a carrier vehicle comprising a copolymer formed by polymerization of:

(i) about 45% to about 55% by weight butyl acrylate,
(ii) about 38% to about 45% by weight methylmethacrylate,
(iii) about 4% to about 10% by weight hydroxyethylmethacrylate,
(iv) about 0% to about 8% by weight methacrylic acid, and
(v) about 0% to about 2% by weight acrylic acid; and (c) a solvent system.

In one embodiment of such a liquid composition for coating surfaces, the carrier vehicle (b) may comprise a copolymer formed by polymerization of (i) about 40% to about 70% by weight methylmethacrylate by weight,
(ii) about 10% to about 30% by weight ethylacrylate, and
(iii) about 20% to about 30% by weight dimethylaminoethylmetacrylate, each based upon the total weight of the copolymer.

Further, the invention includes a method of reducing the reflection of near infrared radiation from a surface, comprising applying to the surface, a liquid composition which comprises a near infrared absorbing agent, a carrier vehicle, and a solvent system; and removing the solvent system, whereby a near-infrared absorbent coating is provided on the surface.

The invention also includes a surface having a coating with a thickness of about 0.25 mil to about 2 mil, comprising a near infrared absorbing agent, and a carrier vehicle, wherein the thickness is measured in a direction transverse to the surface.

The invention also includes a copolymer useful as a carrier vehicle, said copolymer prepared by polymerizing:
(a) about 45% to about 55% by weight butyl acrylate,
(b) about 38% to about 45% by weight methylmethacrylate,
(c) about 4% to about 10% by weight hydroxyethylmethacrylate,
(d) about 0% to about 8% by weight methacrylic acid, and
(e) about 0% to about 2% by weight acrylic acid.

The invention also provides a copolymer useful as a carrier vehicle, said copolymer prepared by polymerizing:
(a) about 40% to about 70% by weight methylmethacrylate,
(b) about 10% to about 30% by weight ethylacrylate,
(c) about 20% to about 30% by weight.

Furthermore, the invention includes a method of producing a copolymer useful as a carrier vehicle, said method comprising polymerizing:
(a) about 45% to about 55% by weight butyl acrylate,
(b) about 38% to about 45% by weight methylmethacrylate,
(c) about 4% to about 10% by weight hydroxyethylmethacrylate,
(d) about 0% to about 8% by weight methacrylic acid, and
(e) about 0% to about 2% by weight acrylic acid.

A method of producing a copolymer useful as a carrier vehicle, said method comprising polymerizing:
(a) about 40% to about 70% by weight methylmethacrylate,
(b) about 10% to about 30% by weight ethylacrylate,
(c) about 20% to about 30% by weight dimethylaminoethylmetacrylate, is also provided by the present invention.

BRIEF DESCRIPTION OF THE SEVERAL VIEWS OF THE DRAWINGS

The foregoing summary, as well as the following detailed description of preferred embodiment(s) of the invention, will be better understood when read in conjunction with the appended drawings. For the purpose of illustrating the invention, there is shown in the drawings embodiment(s) which are presently preferred. It should be understood, however, that the invention is not limited to the precise arrangements and instrumentalities shown. In the drawings.

DETAILED DESCRIPTION OF THE INVENTION

A liquid composition for coating surfaces in accordance with the present invention comprises a near infrared absorbing agent present in an amount of about 0.01% to about 2% by weight, a carrier vehicle present in an amount of about 20% to about 60% by weight, and a solvent system present in an amount of about 40% to about 80% by weight, each based upon the total weight of the composition.

In a preferred embodiment of the invention, the liquid composition comprises a near infrared absorbing agent present in an amount, based upon total weight of the composition, of about 0.1% to about 2% by weight, a carrier vehicle present in an amount of about 30% to about 45% by weight, and a solvent system present in an amount of about 55% to about 70% by weights. In a most preferred embodiment of the invention the liquid composition comprises a near infrared absorbing agent present in an amount, based upon the total weight of the composition, of about 0.25% to about 0.75% by weight, a carrier vehicle present in an amount of about 30% to about 40% by weight, and a solvent system present in an amount of about 60% to about 70% by weight.

The near infrared absorbing agent can be any compound capable of absorbing electromagnetic radiation with a wavelength of about 0.7 microns to about 5 microns. The near infrared absorbing agent should also preferably transmit a large portion of light in the visible spectrum Such compounds include, for example, diimmonium and aminium salts. Exemplary diimmonium salts of the general formula (I) can be used as the near infrared absorbing agent of the present invention:

$$[(R_2NZ)_2N=Z'=NR_2]^{2+}+2X^-  \quad (I)$$

wherein R may be an alkyl group of about 1 to about 6 carbon atoms; Z is preferably an unsubstituted divalent phenyl or a divalent phenyl substituted with one or more moieties such as alkyl, alkoxy, halogen, nitro, cyano, and/or carboalkoxy groups; Z' is preferably an unsubstituted quinoidal phenyl or a quinoidal phenyl substituted with at least one of the following moieties: alkyl, alkoxy, halogen, nitro, cyano, and/or carboalkoxy groups; and X may be, for example, an anion of a strong acid.

Suitable aminium salts of the general formula (II) can be used as the near infrared absorbing agent of the present invention:

$$[(R_2NZ)_3N]^+ + X^-  \quad (II)$$

wherein R is preferably an alkyl group of about 1 to about 6 carbon atoms; Z may be an unsubstituted divalent phenyl or a divalent phenyl substituted with one or more moieties such as alkyl, alkoxy, halogen, nitro, cyano, and/or carboalkoxy groups; and X may be, for example, an anion of a strong acid.

Examples of anions of strong acids which could be used as $X^-$ above in either formula (I) or (II) include perchlorate ($ClO_4^+$), tetrafluoroborate ($BF_4^+$), trichloroacetate ($CCl_3CCO^-$), trifluoroacetate ($CF_3COO^-$), picrate (($NO_2)_3C_6H_2O^-$), hexafluoroaluminate ($AlF_6^-$), hexafluorosilicate ($SiF_6^-$), hexafluoroarsenate ($AsF_6^-$), hexachloroantimonate ($SbCl_6^-$), hexafluoroantimonate ($SbF_6^-$), benzenesulfonate ($C_6H_5SO_3^-$), alkyl sulfonate ($RSO_3^+$) the alkyl group thereof containing 1 to about 18 carbon atoms, hexafluorophosphate ($PF_6^-$), phosphate ($PO_4^{3-}$), sulfate ($SO_4^{2-}$), chloride ($Cl^-$) or bromide ($Br^-$). Hexafluoroantimonate ($SbF_6^-$)

and hexafluoroarsenate ($AsF_6^-$) are also known for their heat resistance and may be used in the present invention.

The preferred near infrared absorbing agents of the present invention are N,N-dialkyl-N',N'-bis(p-dialkylaminophenyl)benzoquinone diimmonium salts of tetrafluoroborate, hexafluoroantimonate, hexafluorophosphate, hexafluoroaluminate, hexafluorosilicate, hexafluoroarsenate, and perchlorate. Examples of such are N,N-di-n-butyl-N',N'-bis(p-di-n-butylaminophenyl) benzoquinone diimmunonium hexafluoroantimonate, N,N-diethyl-N',N'-bis(p-diethylaminophenyl) benzoquinone diimmonium hexafluoroantimonate, and N,N-diethyl-N',N'-bis(p-diethylaminophenyl) benzoquinone diimmonium hexafluorophosphate. Near infrared absorbing agents of these types are described in U.S. Pat. No 3,440,257 and U.S. Pat. No. 5,686,639, the contents of each are herein incorporated by reference.

The carrier vehicles of the compositions of the present invention can be a homopolymer, a copolymer, an oligomer, a terpolymer, or mixtures thereof. Polymers which may be used include, but are not limited to, celluloses, polyacrylics including acrylic polymers, methylacrylic polymers, acrylate and methacrylate polymers, polyurethanes, polyesters, polyvinyls, polyamides, and polyolefins such as polyethylene and polypropylene, and derivatives and mixtures thereof. The polymers which may be used may be either water-borne or solvent-borne.

In one preferred embodiment of the present invention the carrier vehicle is an acrylic homopolymer or copolymer with carboxyl and hydroxy functionality. The acrylic homopolymer or copolymer can be water-soluble, or at least miscible with water to some degree. The acrylic homopolymers or copolymers of the present invention having any degree of water-solubility, whether completely miscible, or only partly miscible with water, are referred to herein as water-borne acrylic polymers. The preferred water-borne acrylic polymer is a copolymer having an acid number of about 0 to about 50, preferably about 20 to about 45, and most preferably about 30 to about 40; and having a hydroxyl number of about 15 to about 50, and more preferably about 20 to about 50.

The molecular weights of the preferred water-borne acrylic polymers of the present invention preferably range about 20,000 g/mol to about 40,000 g/mol, and more preferably about 25,000 g/mol to about 35,000 g/mol. The water-borne acrylic polymers also preferably have a solids content of about 45% to about 55% by weight, the remainder being any one or more of water, other solvents, surfactants and impurities.

A preferred water-borne acrylic polymer of the present invention is a copolymer polymerized from monomers including butyl acrylate, methylmethacrylate, hydroxyethylmethacrylate, methacrylic acid, and acrylic acid.

In such a copolymer, butyl acrylate may be present in an amount of about 45% to about 55% by weight, preferably in an amount of about 49% to about 52% by weight, and more preferably in an amount of about 49% to about 50% by weight, based upon the total weight of the copolymer.

Methylmethacrylate can be present in an amount of about 38% to about 45% by weight, preferably in an amount of about 40% to about 45% by weight, and more preferably in an amount of about 42% to about 45% by weight, based upon the total weight of the copolymer.

Hydroxyethylmethacrylate can be present in an amount of about 4% to about 10% by weight, and preferably in an amount of about 4% to about 6% by weight, based upon the total weight of the copolymer.

Methacrylic acid can be present in an amount of about 0% to about 8% by weight, preferably in an amount of about 0% to about 5% by weight, and more preferably in an amount of about 0% to about 3% by weight, based upon the total weight of the copolymer.

Acrylic acid can be present in an amount of about 0% to about 2% by weight, based upon the total weight of the copolymer.

Alternatively, another preferred water-borne acrylic polymer of the present invention is a copolymer polymerized from monomers including methylmethacrylate, ethylacrylate and dimethylaminoethylmetacrylate.

In such a copolymer, methylmethacrylate may be present in an amount of about 40% to about 70% by weight, based upon the total weight of the copolymer.

Ethylacrylate may be present in an amount of about 10% to about 30% by weight, based upon the total weight of the copolymer.

Dimethylaminoethylmetacrylate may be present in an amount of about 20% to about 30% by weight, based upon the total weight of the copolymer.

The polymers are preferably formed by any suitable polymerization procedure including random, block or graft polymerization. Most preferably the copolymer is formed by a continuous addition process conducted over a time period of about 1.5 to about 2 hours at a temperature of about 82–84° C. at atmospheric pressure, in the presence of a nitrile catalyst. The catalyst is preferably a 2,2'-azobis-(2-alkyl) butyronitrile compound, such as, for example 2,2' azobis (2-methyl) butyronitrile or 2,2'azobis (2-ethyl) butyronitrile. The polymerization is preferably carried out in a secondary alcohol medium, such as, for example, an isopropanol medium. However, it will be understood, based on the disclosure, that other suitable water-borne polymers or polymerization procedures could be used without departing from the scope of the present invention.

The carrier vehicle of the present invention may also be a mixture of more than one type of polymer. For example, a polyurethane and an acrylic polymer mixture could be used as the carrier vehicle in the present invention. Shellac may also be used.

The carrier vehicle of the present invention may also be an organic solvent-borne polymer having a solids content of about 40% to about 50% by weight, and preferably about 45% by weight. Such solvent-based polymer formulations are generally known to those of ordinary skill in the art for other purposes. One example of a preferred solvent-borne polymer useful as a carrier vehicle in the present invention is the acrylic copolymer Acryloid® B67, available from Rohm & Haas Co., Inc., of Philadelphia, Pa. (also available under the name Paraloid®).

In situations where the environment is of particular concern, water-borne carrier vehicles that contain little or no volatile organic solvents are preferred.

Solvent systems useful in the present invention should include one or more individual solvent components which are each compatible with both the near infrared absorbing agent and the carrier vehicle and should be co-miscible with each other. Therefore, a solvent system which may be used in the present invention may include one or more solvent components depending on the selection of the particular near infrared absorbing agent and carrier vehicle for compatibility purposes. Ketones, such as acetone and methylethylketone, are preferred for use in the solvent system as components for dissolving diimmunonium salts, although any organic solvent capable of dissolving the near infrared absorbing agents of the present invention, which is also compatible with the carrier vehicle, can be used. Solvents system components which are preferably incorporated into the solvent system of the present invention when a solvent-borne carrier vehicle is selected include, but are not limited to, alcohols, ketones, naphtha and naphtha derivatives, and other known organic solvents having similar solubility properties and which are compatible with substantially hydrophobic solutes.

The solvent components which are preferably incorporated into the solvent system of the present invention, when a water-borne carrier vehicle is selected, include, but are not limited to, alcohols (such as ethanol, propanol, butanol, isopropanol, sec-propanol, t-butanol, etc.), ketones, terpenes, glycol ethers, water and mixtures thereof. Terpenes and other citrus-based solvents including d-limonene may be used. Horizon® EP, a solvent available from Inland Technology, Inc., of Tacoma, Wash., may be used in the solvent system according to the present invention.

Other solvents such as citrus-based solvents and glycol ethers, including for example, Cellosolve® ethers and other propylene glycol ethers, can also be incorporated, alone or in combination with other solvent components such as ketones, into the solvent system of the present invention.

Another factor which is preferably considered in selecting the solvent system of the present invention is evaporation rate. The solvent component, or components, of the solvent system should evaporate, at room temperature, at a rate quick enough to allow for ease of application and quick drying of the coating on a surface, yet slow enough to maintain a uniform and level coating upon drying. Evaporation should therefore be as quick as possible, provided an even coating can be maintained. Lower molecular weight solvents such as one or more of the propanol isomers (e.g., n-, iso-, sec-) and/or acetone are preferable for this reason. Butanol isomers (e.g., n-, iso-, sec-, tert-) can also be used, but are slower to evaporate than propanol(s), somewhat inhibiting easy coating of a surface. This becomes more significant when coating a vertical surface due to the effects of gravity on coating thickness and uniformity, and in order to prevent sagging.

In order to enhance the adherence and water-resistance properties of the liquid compositions of the present invention, such compositions may optionally include one or more organofunctional silane additives selected from the group consisting of aminofunctional silanes, glycidoxy (epoxy)functional silanes and vinylfunctional silanes. Preferred organofunctional silane additive(s) include the glycidoxy(epoxy)functional silane 3-glycidoxypropyltrimethoxysilane, available as Dow Corning® Z-6040 Silane, and the vinylfunctional silane vinyltrimethoxy silane, available as Dow Corning® 9-6300, both from Dow Corning Corporation, Midland, Mich. The one or more organofunctional silane additive(s) may be present in the liquid composition, an amount of about 0.01% to about 2% by weight. If the one or more silane additives chosen is a glycidoxy(epoxy)functional silane, it is preferably present in the liquid composition in an amount of about 0.1% to 0.5% by weight, more preferably in an amount of about 0.2% to about 0.35% by weight. In the case that the one or more organofunctional silane additive is a vinylfunctional silane, it is preferably present in an amount of about 0.01% to about 2% by weight, more preferably in an amount of about 0.04% to about 0.09% by weight.

Further, the liquid compositions of the present invention may optionally include any number of additional preferred additives such as ultraviolet absorber(s), flatting agent(s), slip agent(s), pH modifier(s) and colorant(s).

Exposure to ultraviolet radiation can increase the rate of chemical degradation of the near infrared absorbing agent and limit its capability to absorb light in the near infrared spectrum Common UV absorbers which can be used in accordance with the present invention include hydroxybenzophenones, hydroxyphenyl benzotriazoles, cinnamates, and oxanilides. In fact, any compound which is capable of absorbing ultraviolet light and which does not substantially affect the NIR absorbing agent's capacity to absorb NIR radiation can be added to the composition. The UV absorbing compound may be added in an amount up to about 2% by weight, and preferably about 0.5% to about 2% by weight. Cyasorb® UV-24 and Cyasorb® UV-5411, both available commercially from Cytec Industries, Inc., of West Patterson, N.J., are examples of such compositions.

It is preferred that reflection of near infrared radiation, and glare in general, from the surface coated with the composition of the invention be minimized. This can be accomplished by the addition of one or more flatting agents to the liquid compositions of the invention. Silica is an example of such a flatting agent. Other flatting agents that can be used in the compositions of the invention include heavy metal soaps (i.e., soaps formed with metals heavier than sodium), diatomaceous earth, flatting urea derivatives, and the like.

The compositions of the present invention may also include one or more slip agents. Slip agents, such as silicone-based materials, fluoropolymer powders, graphite, fatty acid esters, hydrocarbon waxes, etc., may be added to provide certain water-resistant properties to the coatings. While normally intended to provide lubricating properties, slip agents which are hydrophobic in nature may help to enhance the weather resistant properties of the liquid compositions and resulting coatings.

The compositions of the present invention may also include one or more pH modifiers. For example, ammonia and/or other basic compounds, such as, for example, amines, may be added to raise the pH of the composition. Certain near infrared absorbing agents may produce acidic liquid compositions, and pH modifiers can be added to neutralize the compositions.

Additionally, depending on the specific near infrared absorbing agent used, the liquid compositions of the invention, once applied to a surface, may exhibit a slight tint which could be undesirable in some applications. In such cases, it is preferable to include one or more colorants to color balance the coating composition, thereby producing a neutral or gray tint in the resulting coating.

Various flow and leveling modifiers, fillers, thickeners, and thixotropic modifiers may be added to the compositions of the invention to impart specific desired application properties. However, it will be understood that other additives which do not affect the near infrared absorbing properties, the uniform coating properties, or the compatibility and/or miscibility of the components of the compositions of the present invention can be added to modify properties as desired.

The present invention also relates to a method of reducing the reflection of near infrared radiation from a surface. The method includes applying a liquid composition to the surface. The composition is preferably the composition as described above in accordance with the present invention and includes a near infrared absorbing agent, a carrier vehicle and a solvent system The solvent system is removed preferably after application of the composition to a surface. Preferably, the solvent system is removed by evaporation in ambient conditions, but could be removed with the aid of reduced pressure, heat or other methods by which drying rates can be increased.

A coating applied in accordance with the method of the present invention generally has a thickness of about 0.25 mil to about 2 mil. Preferably the coating is about 0.5 mils to about 1.5 mils in thickness, and is most preferably about 0.5 mils to about 1.0 mils in thickness. Such coating thicknesses are greater than that of polishes and waxes and provide increased NIR absorbency and increased durability. Coatings applied in accordance with the method of the present invention are capable of absorbing greater than about 99% of radiation with wavelength of about 885–920 nm incident upon the coating, depending on the particular near infrared absorbing agent selected. The portion of light within the visible spectrum that is transmitted is about 75% or more, and preferably about 85% or more.

The compositions useful in the method can be applied to surfaces in the same manner as a paint or varnish, e.g., by brush, roller, spray, or similar methods of application. The liquid compositions can also be applied by immersing or dipping the surface into the liquid coating composition. After such application the solvent system is removed, for example, by room temperature evaporation. It is possible of course to augment or enhance the removal of the solvent system, by for example heating, or decreasing pressure, so long as the uniformity of the coating is not impaired.

The invention also includes a surface having a coating of about 0.25 mil to about 2 mil in thickness, which includes a near infrared absorbing agent, and a carrier vehicle. Preferably the NIR absorbing agent and carrier vehicle are as described above. Near infrared light is absorbed by the coating and visible light is reflected from the surface. Surfaces which reflect electromagnetic radiation such as glass, metal, and plastic can be coated with a composition comprising a near infrared absorbing agent, a carrier vehicle, and a solvent system in accordance with the method of the present invention, as described above. It is preferred, if using the coating to absorb laser radiation emitted from detection devices for moving vehicles or military purposes, that the coating be applied to all metal, glass and other highly reflective surfaces such as lights, chrome trims, license plates, etc., but not necessarily to painted surfaces, such as the body of a moving vehicle. It may be desirable to avoid coating painted surfaces in order to minimize any risk of harming painted or wax-coated finishes. Further, in developing the composition and method of the present invention, it was discovered that coating surfaces such as, for example, glass, chrome, and license plates on motor vehicles, provided significantly better results with respect to attenuating the effects of near infrared radiation incident on these surfaces than coating painted surfaces, such as automobile body parts. While the painted surfaces of an automobile may be coated, the overall attenuating effect is not significantly enhanced by comparison. In addition, it is preferred to avoid using a composition which may include an organic solvent base on a painted surface in order to avoid damage to the paint finish.

Upon removal of a solvent system, the surface is left having a coating with a thickness of about 0.25 mils to about 2 mil, comprising a near infrared absorbing agent and a carrier vehicle. Preferably, the coating has a thickness of about 0.5 mils to about 1.5 mils, and more preferably about 0.5 mils to about 1.0 mils.

The following non-limiting examples serve to further illustrate specific embodiments of the invention.

EXAMPLE 1

A composition in accordance with the present invention was prepared by mixing the following ingredients.

| | |
|---|---|
| isopropyl alcohol | 7.86 g |
| n-propyl alcohol | 7.88 g |
| acrylic copolymer | 66.43 g |
| ammonia (aq) 28% | 1.984 g |
| n-butanol | 7.96 g |
| acetone | 3.9 g |
| Epolite ® III-189 | 0.25 g |
| Cyasorb ® UV-24 | 0.3 g |
| Total Weight | 96.561 g |

Epolite® III-189, which is a near-infrared absorbing compound, is commercially available from Epilon, Inc. of Newark, N.J.

In a beaker the isopropyl alcohol and n-propyl alcohol were combined and stirred continuously. The stirring was performed at a slow rate to avoid excess foam generation. The acrylic copolymer solution was added slowly to the mixture of alcohols. The acrylic copolymer was a water-based acrylic copolymer with a weight percent solids content of 48.8%, the remainder being water and impurities. The particular water-borne acrylic co-polymer was formed by polymerizing, in a continuous addition process various acrylic-based monomers. The approximate weight percent and type of monomers present in the copolymer were: butyl acrylate (50% by weight), methylmethacrylate (42% by weight), hydroxyethyl methacrylate (4% by weight), methacrylic acid (4% by weight) and acrylic acid (0.1% by weight). The monomers were polymerized in isopropyl alcohol for a period of about 2 hours under atmospheric pressure at a reflux temperature of about 82–84° C. 2,2'Azobis(2-ethyl butyronitrile) was used as the catalyst.

Using a dropper, about 40% of the aqueous ammonia was added dropwise to the copolymer/alcohol mixture, at a rate of about 1–2 drops per second to raise the pH of the mixture. The n-butanol was then added to the beaker containing the copolymer/alcohol/ammonia mixture. The remainder of the aqueous ammonia was then added to the beaker to complete neutralization. In a separate beaker, Epolite® III-189 and Cyasorb® UV-24 were combined, and dissolved in acetone. The acetone solution of the Epolite® III-189 and Cyasorb® UV-24 was then added slowly during the continuous mixing to the mixture of solvent, copolymer, and ammonia to form a liquid composition which was used to form a coating on surfaces in accordance with the present invention.

Laser pulses having a wavelength of 904 nanometers were emitted from a LIDAR speed detection gun towards an uncoated automobile. The LIDAR speed detection gun detected the stationery automobile at distances of up to approximately 1300 feet. Then, using a small, normal paintbrush, the liquid composition was applied to the headlights, bumpers, license plates and reflectors of the automobile. The solvent system was removed by evaporation. The coatings had a thickness of approximately 0.75 mils. Using the same LIDAR speed detection gun, the stationary automobile was barely detectable at a distance of approximately 700 feet. The same types of comparative tests were conducted using different automobiles and are summarized below in Table 1.

Automobile A was a late model, teal green, mid-size sedan with no front license plate (Dodge Intrepid). Automobile B was a 1987 silver compact with retractable headlights in the up position (Honda Accord). Automobile B' was the same silver Honda Accord with the retractable lights in the down position. Automobile C was a late model, white, mid-size sedan with no front license plate (Chevrolet Monte Carlo).

TABLE 1

| Automobile | Average Detection Distance - no coating (feet) | Average Speed of Auto upon detection - no coating (mph) | Average Detection Distance - with coating (feet) | Average Speed of Auto upon detection - with coating (mph) |
| --- | --- | --- | --- | --- |
| A  | 1235   | 32.0  | 762    | 35.86 |
| A  | 1108   | 77.75 | 677    | 68.0  |
| B  | 1228   | 30.0  | 624.2  | 37.4  |
| B' | 586.25 | 33.75 | 513.5  | 43.0  |
| C  | 1497   | 47.5  | 1074.5 | 39.5  |

It can be seen from the results in Table 1 above that the application of a coating composition of the present invention can dramatically decrease the reflection of near infrared radiation by absorbing radiation with a wavelength of approximately 904 nm. In most instances, the maximum detection distance is reduced by about 33% to about 50% by weight after one application. Furthermore, comparison of Automobile A at high and low speeds demonstrates that higher speeds require shorter distances for detection. Also, comparison of Automobile B and B' demonstrates that glass (headlights) play a major role in near infrared radiation reflection. While lighter paint colors such as white in the case of Automobile C reflect more near infrared radiation than darker paint colors such as teal green, the most important surfaces are the unpainted glass and metal surfaces such as headlights, bumpers, grilles, reflectors and license plates.

EXAMPLE 2

Using the same procedure as in Example 1, a composition in accordance with Example 1 was prepared, except that 0.50 g of Epolite® III-189 was dissolved in acetone.

EXAMPLE 3

Using the same procedure as in Example 1, a composition in accordance with Example 1 was prepared, except that 0.75 g of Epolite® III-189 was dissolved in acetone.

EXAMPLE 4

A composition in accordance with the present invention was prepared by mixing the following ingredients.

| | |
| --- | --- |
| isopropyl alcohol | 27.75 g |
| Acryloid ® B67 | 60.00 g |
| acetone | 3.50 g |
| Epolite ® III-189 | 0.50 g |
| Cyasorb ® UV-24 | .25 g |
| glycol ether | 8.00 g |
| Total Weight | 100.00 g |

Acryloid®B67, which is a solvent borne acrylic copolymer, is commercially available from Rohm & Haas of Philadelphia, Pa.

The alcohol, which can be mixed with n-propyl alcohol or n-butyl alcohol, or a mixture of two or more of these, was placed in a beaker. The Acryloid®B67 was added slowly, while stirring, to the alcohol. The stirring was performed slowly to minimize foam formation. The acetone, Epolite® III-189, and Cyasorb® UV-24 were combined in a separate beaker and mixed until both the III-189 and UV-24 had dissolved in the acetone. The Acryloid® B67/alcohol mixture was combined with the acetone solution, and the glycol ether was added. Acryloid® B67 has a percent solids content of 45%.

EXAMPLE 5

Using the same procedure as in Example 1, a composition in accordance with Example 1 is prepared, except that instead of using Epolite® III-189 as the NIR absorbing agent, tris (p-diethylaminophenyl) aminium hexafluoroarsenate is used.

EXAMPLE 6

Using the same procedure as in Example 2, a composition in accordance with Example 2 is prepared, except that instead of using Epolite® III-189 as the NIR absorbing agent, tris (diethylaminophenyl) aminium hexafluoroantimonate is used.

EXAMPLE 7

Figure 1:
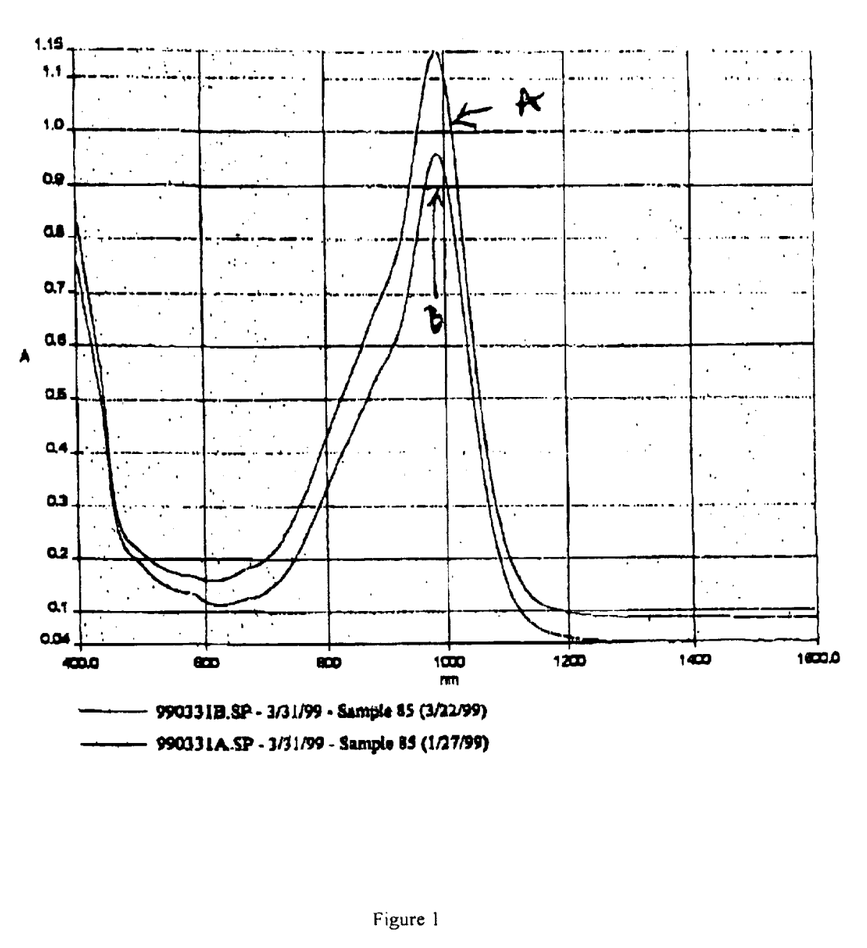
FIG. 1 is a graphical representation of the absorbance (A) of the coating prepared using the liquid composition of Example 7, measured at several different wavelengths, both upon initial coating and two months later.
Figure 2:
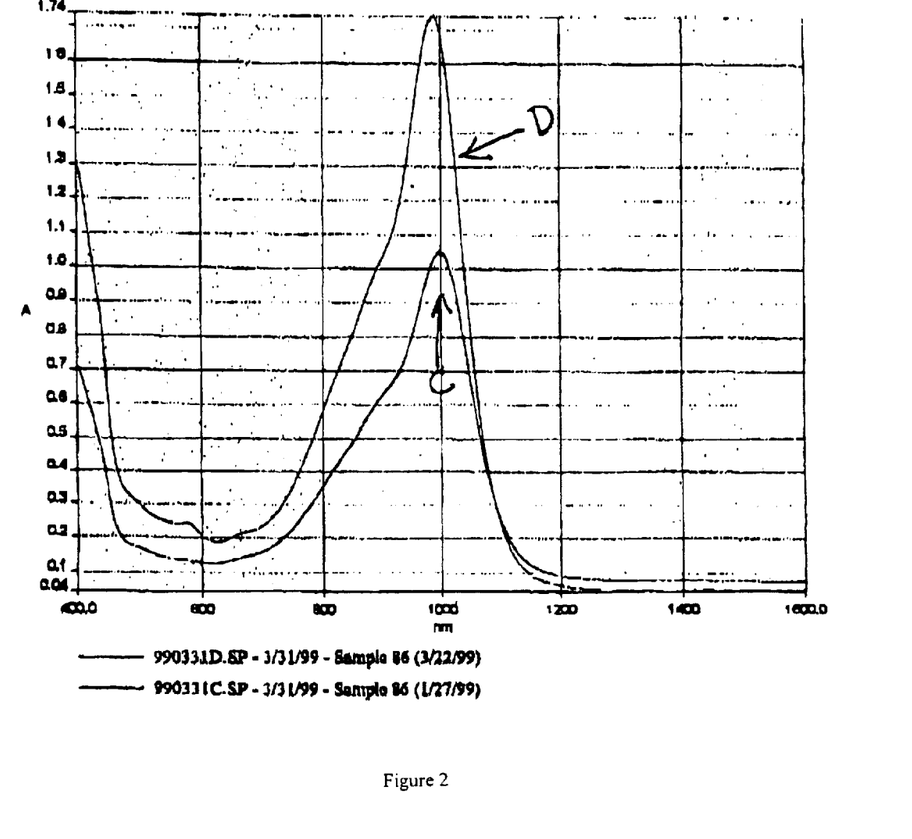
FIG. 2 is a graphical representation of the absorbance (A) of the coating prepared using the liquid composition of Example 8, measured at several different wavelengths, both upon initial coating and two months later.
Figure 3:
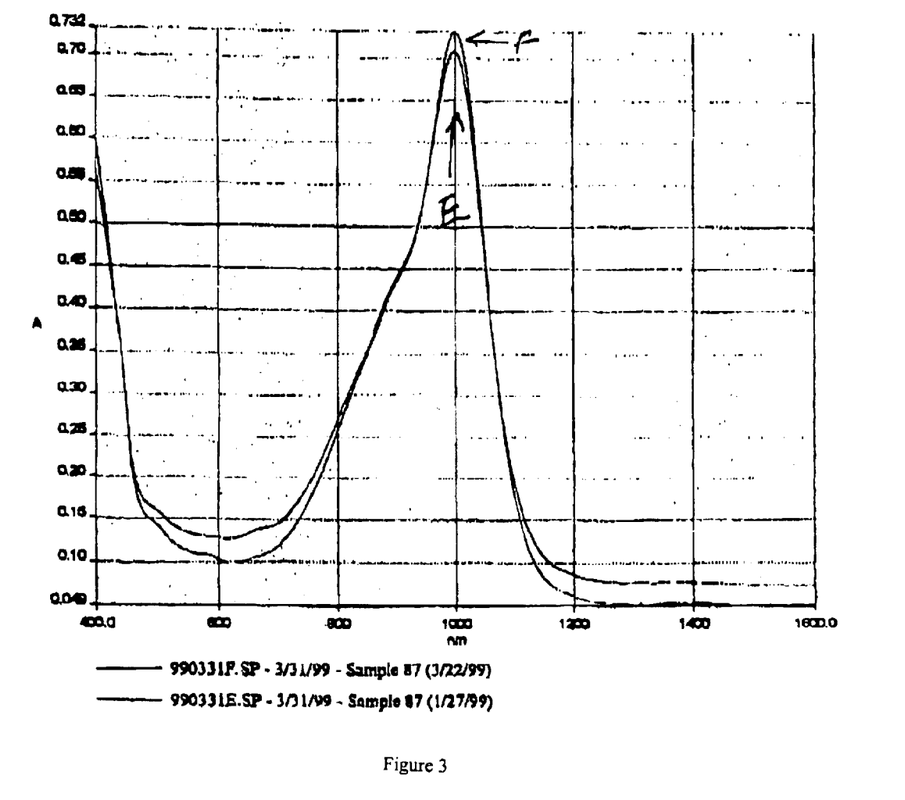
FIG. 3 is a graphical representation of the absorbance (A) of the coating prepared using the liquid composition of Example 9, measured at several different wavelengths, both upon initial coating and two months later.
Figure 4:
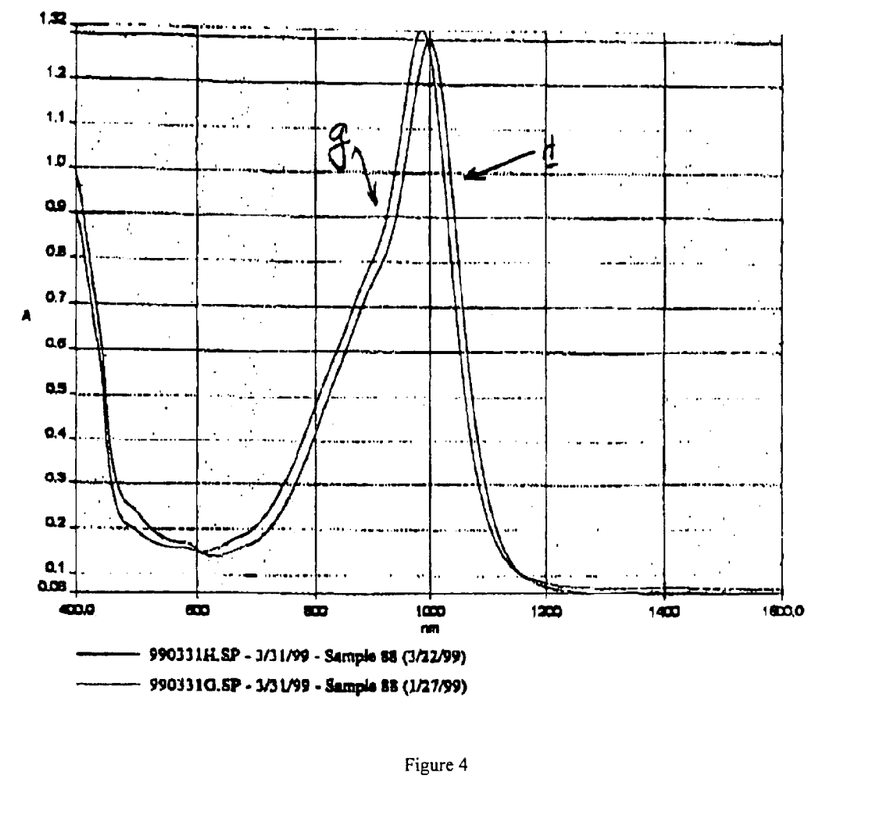
FIG. 4 is a graphical representation of the absorbance (A) of the coating prepared using the liquid composition of Example 10, measured at several different wavelengths, both upon initial coating and two months later.
Figure 5:
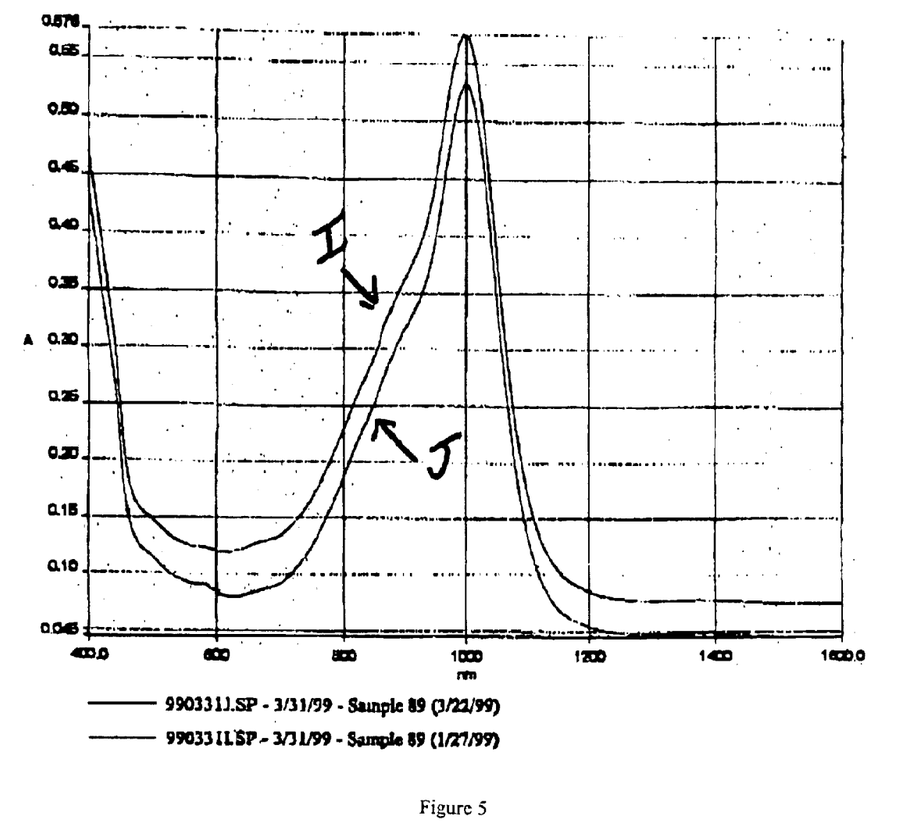
FIG. 5 is a graphical representation of the absorbance (A) of the coating prepared using the liquid composition of Example 11, measured at several different wavelengths, both upon initial coating and two months later.

Using the same procedure as in Example 1, a composition in accordance with the present invention was prepared by mixing the following ingredients: 0.15 g of Epolite® IV-67; 25 mL of the water-borne acrylic copolymer used in Example 1; 5.0 mL of Horizon® EP solvent; 15 mL of acetone; and 0.25 g of UV-5411® ultraviolet absorbing agent. Epolite® IV-67 is another near infrared absorbing compound available from Epilon, Inc., of Newark, N.J. The liquid composition was then applied to a glass slide ("Slide I") and subjected to absorption tests at wavelengths ranging from 400 nm to 1800 nm (curve A of FIG. 1). The slide was allowed to sit in the ambient atmosphere for a period of approximately two months and was then subjected to the same absorption tests (curve B of FIG. 1).

EXAMPLE 8

Using the same procedure as in Example 1, a composition in accordance with Example 7 was prepared, except that instead of using Epolite® IV-67 as the NIR absorbing agent, 0.15 g of Epolite® III-184 was used. Epolite® III-184 is another near infrared absorbing compound available from Epilon, Inc., of Newark, N.J. The liquid composition was then applied to a glass slide ("Slide II") and subjected to absorption tests at wavelengths ranging from 400 nm to 1800 nm (curve D of FIG. 1). The slide was allowed to sit in the ambient atmosphere for a period of approximately two months and was then subjected to the same absorption tests (curve C of FIG. 1).

EXAMPLE 9

Using the same procedure as in Example 1, a composition in accordance with Example 7 was prepared, except that instead of using Epolite® IV-67 as the NIR absorbing agent, 0.15 g of Epolite® III-189 was used. The liquid composition was then applied to a glass slide ("Slide III") and subjected to absorption tests at wavelengths ranging from 400 nm to 1800 nm (curve F of FIG. 1). The slide was allowed to sit in the ambient atmosphere for a period of approximately two months and was then subjected to the same absorption tests (curve E of FIG. 1).

EXAMPLE 10

Using the same procedure as in Example 1, a composition in accordance with Example 7 was prepared, except that instead of using Epolite® IV-67 as the NIR absorbing agent, 0.15 g of Epolite® IV-62B was used. Epolite® IV-62B is another near infrared absorbing compound available from Epilon, Inc., of Newark, N.J. The liquid composition was then applied to a glass slide ("Slide IV") and subjected to absorption tests at wavelengths ranging from 400 nm to 1800 nm (curve G of FIG. 1). The slide was allowed to sit in the ambient atmosphere for a period of approximately two months and was then subjected to the same absorption tests (curve H of FIG. 1).

EXAMPLE 11

Using the same procedure as in Example 1, a composition in accordance with Example 7 was prepared, except that instead of using Epolite® IV-67 as the NIR absorbing agent, 0.15 g of Epolite® III-192 was used. Epolite® III-192 is another near infrared absorbing compound available from Epilon, Inc., of Newark, N.J. The liquid composition was then applied to a glass slide ("Slide V") and subjected to absorption tests at wavelengths ranging from 400 nm to 1800 nm (curve I of FIG. 1). The slide was allowed to sit in the ambient atmosphere for a period of approximately two months and was then subjected to the same absorption tests (curve J of FIG. 1).

FIGS. 1–5 and Examples 7–11 demonstrate the durability and absorptivity of the coatings provided in accordance with the present invention. FIGS. 1–5 show that the liquid compositions of Examples 7–11, respectively, provide excellent transmission in the visible range (~400 nm to ~700 nm), while still absorbing a substantial portion of the light in the near infrared spectrum. Lines A and B of FIG. 1 demonstrate that the coating obtained from the liquid composition of Example 7 absorbed only slightly less effectively after two months, evidencing the coating's durability. After taking experimental error into account with respect to measurement, the difference between absorbency over time is negligible. Lines C and D of FIG. 2 demonstrate that the coating obtained from the liquid composition of Example 8 absorbed somewhat less effectively after two months, but still absorbed a substantial amount of the near infrared light. Lines B and F of FIG. 3 demonstrate that the coating obtained from the liquid composition of Example 9, which incorporated the preferred near infrared absorbing agent, absorbed virtually the same amount of near infrared radiation and transmitted even more visible light, after two months. Lines G and H of FIG. 4 demonstrate that the coating obtained from the liquid composition of Example 10 absorbed virtually the same amount of near infrared radiation after two months, but with a slightly shifted peak absorption wavelength. Lines I and J of FIG. 5 demonstrate that the coating obtained from the liquid composition of Example 11 absorbed only slightly less effectively after two months.

EXAMPLE 12

Glass slide A was prepared by twice dipping the slide into the liquid coating composition prepared in accordance with Example 1, and subsequently removing the slide and allowing it to air dry. The slide was allowed to air dry for several hours, until the solvent had evaporated and a hard, uniform coating with a thickness of approximately 0.75 mils remained. The slide was then subjected to absorption and transmission testing. The results are summarized below in Table 2.

EXAMPLE 13

Glass slide B was prepared by twice dipping the slide into the liquid coating composition of Example 2 and subsequently removing the slide and allowing it to air dry. The slide was allowed to air dry for several hours, until the solvent had evaporated and a hard, uniform coating with a thickness of 0.60 mils remained. The slide was then subjected to absorption and transmission testing. The results are summarized below in Table 2.

EXAMPLE 14

Glass slide C was prepared by twice dipping the slide into the liquid coating compositions of Example 3 and subsequently removing the slide and allowing it to air dry. The slide was allowed to air dry for several hours, until the solvent had evaporated and a hard, uniform coating with a thickness of 0.75 mils remained. The slide was then subjected to absorption and transmission testing. The results are summarized below in Table 2.

TABLE 2

| Slide | Coating Thickness (mils) approx. | Absorbance at 904 nm (%) | Transmittance in Visible Range ~400–700 nm (%) |
|---|---|---|---|
| A | 0.75 | 99.0 | 84.7 |
| B | 0.60 | 99.9 | 78.4 |
| C | 0.75 | 99.9 | 74.7 |

The data in Table 2 demonstrates that suitable absorbance can be obtained with small amounts of near infrared absorbing compound. Furthermore, adequate absorbency can be obtained without sacrificing transmission of visible light at fairly low concentrations. Thus, it is possible to use the liquid compositions of the present invention to coat large transparent (glass) objects so as to reduce the reflection and transmission of near infrared radiation, without significantly affecting the transparency of the object.

EXAMPLE 15

A composition in accordance with the present invention was prepared by mixing the following ingredients.

| | |
|---|---|
| acrylic copolymer | 63.49 g |
| Epolite ® III - 189 | 0.45 g |
| acetone | 17.84 g |
| Horizon ® EP | 9.01 g |
| Cyasorb ® UV-5411 | 2.7 g |
| propylene glycol methyl ether | 6.52 g |
| Dow Corning ® Z-6040 Silane | 0.09 g |
| Total weight | 100.1 g |

Horizon® EP solvent is commercially available from Inland Technology, Inc., Tacoma, Wash. Cyasorb® UV-5411, which is an infrared absorbing agent, is commercially available from Cytec Industries, Inc. of West Patterson, N.J.

The propylene glycol methyl ether was placed in a beaker to which the acrylic copolymer was added. The acrylic copolymer was a water-based acrylic copolymer with a weight percent solid content of about 49.5%, the remainder being solvent and impurities. The approximate weight percent and type of monomer present in the copolymer were: methylmethacrylate (50% by weight), ethylacrylate (20% by weight) and dimethylaminoethylmetacrylate (30% by weight). The monomers were polymerized in isopropanol for a period of about 2 hours under atmospheric pressure at a reflux temperature of about 83° C. Butene nitrile, 2 methyl, 2,2 azo-bis was used as a catalyst.

In a separate beaker, Horizon® EP, Epolite® III-189 and Cyasorb® UV-5411 were combined by dissolving in acetone. This mixture was added slowly during continuous mixing to the mixture of copolymer and solvent to form the liquid composition for coating surfaces in accordance with the present invention.

EXAMPLE 16

Using the procedure of Example 15, a composition in accordance with the present invention was prepared by mixing the following ingredients.

| | |
|---|---|
| Horizon ® EP | 8.24 g |
| acetone | 14.58 g |
| Cyasorb ® UV-5411 | 2.21 g |
| propylene glycol methyl ether | 5.07 g |
| acrylic copolymer | 51.89 g |
| Epolite ® III-189 | .23 g |
| propylene glycol methyl ether acetate | 17.78 g |
| Total weight | 100.00 g |

The acrylic copolymer was a water-based copolymer with a percent solids content of 49.5%, the remainder being solvent and impurities. The approximate weight percent and type of monomer present in the copolymer were: methylmethacrylate (55% by weight), ethylacrylate (15% by weight), and dimethylaminoethylmetacrylate (30% by weight).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A liquid composition for coating surfaces comprising
    (a) about 0.01% by weight to about 2% by weight of a near infrared absorbing agent selected from the group consisting of compounds of the formula (I):

[(R$_2$NZ)$_2$N=Z'=NR$_2$]$^{2+}$+2X$^-$      (I)

wherein R is an alkyl group of about 1 to about 6 carbon atoms; Z is an unsubstituted divalent phenyl or a divalent phenyl substituted with at least one moiety selected from the group consisting of alkyl, alkoxy, halogen, nitro, cyano, and carboalkoxy groups; Z' is an unsubstituted quinoidal phenyl or a quinoidal phenyl substituted with at least one moiety selected from the group consisting of alkyl, alkoxy, halogen, nitro, cyano, and carboalkoxy groups; and X is an anion of a strong acid, and compounds of the formula (II):

[(R$_2$NZ)$_3$N]$^+$+PF$_6^-$      (II)

wherein R is an alkyl group of about 1 to about 6 carbon atoms; Z is an unsubstituted divalent phenyl or a divalent phenyl substituted with at least one moiety selected from the group consisting of alkyl, alkoxy, halogen, nitro, cyano, and carboalkoxy groups; and X is an anion of a strong acid;
    (b) about 20% by weight to about 60% by weight of a carrier vehicle; and
    (c) about 40% by weight to about 80% by weight of a solvent system, each based on the total weight of the composition.

2. The liquid composition of claim 1 comprising about 0.1% to about 2% by weight of the near infrared absorbing agent, about 30% by weight to about 45% by weight of the carrier vehicle; and about 55% by weight to about 70% by weight of the solvent system, each based upon the total weight of the composition.

3. The liquid composition for coating surfaces of claim 1 further comprising an one or more organofunctional silane additive(s) selected from the group consisting of aminofunctional silanes, epoxyfunctional silanes and vinyl functional silanes.

4. The liquid composition for coating surfaces of claim 3, wherein the one or more organofunctional silane additive(s) are present in the amount of about 0.01% to about 2% by weight of the liquid composition.

5. The liquid composition for coating surfaces of claim 1, wherein the carrier vehicle is at least one of a homopolymer or a copolymer selected from the group consisting of cellulose, polyacrylics, polyurethanes, polyesters, polyvinyls, polyamides, and polyolefins.

6. The liquid composition for coating surfaces of claim 5, wherein the carrier vehicle comprises an acrylic copolymer.

7. The liquid composition for coating surfaces of claim 6, wherein the carrier vehicle comprises a polyurethane.

8. The liquid composition for coating surfaces of claim 1, wherein the carrier vehicle comprises a water-borne carboxyl and hydroxyl functional acrylic copolymer.

9. The liquid composition for coating surfaces of claim 1, wherein the carrier vehicle comprises a copolymer formed by polymerization of monomers comprising:
    (a) about 45% to about 55% by weight butyl acrylate,
    (b) about 38% to about 45% by weight methylmethacrylate,
    (c) about 4% to about 10% by weight hydroxyethylmethacrylate,
    (d) about 0% to about 8% by weight methacrylic acid, and
    (e) about 0% to about 2% by weight acrylic acid.

10. The liquid composition for coating surfaces of claim 1, wherein the carrier vehicle comprises a copolymer formed by the polymerization of monomers comprising:
    (a) about 40% to about 70% by weight methylmethacrylate,
    (b) about 10% to about 30% by weight ethylacrylate,
    (c) about 20% to about 30% by weight dimethylaminoethylmethacrylate.

11. The liquid composition for coating surfaces of claim 1, wherein the solvent system comprises a ketone.

12. The liquid composition for coating surfaces of claim 11, wherein the ketone is selected from the group consisting of acetone, and methylethylketone.

13. The liquid composition for coating surfaces of claim 11, wherein the solvent system further comprises at least one component selected from the group consisting of alcohols, terpenes, and glycol ethers.

14. The liquid composition for coating surfaces of claim 1, further comprising one or more additives selected from the group consisting of ultraviolet absorbers, flatting agents, slip agents, and pH modifiers.

15. A liquid composition for coating surfaces comprising;
(a) a near infrared absorbing agent selected from the group consisting of compounds of the formula (1):

$$[(R_2NZ)_2N{=}Z'{=}NR_2]^{2+} + 2X^- \qquad (I)$$

wherein R is an alkyl group of about 1 to about 6 carbon atoms; Z is a divalent phenyl which may or may not be ring substituted with one or more alkyl, alkoxy, halogen, nitro, cyano, and carboalkoxy groups; Z' is a quinoidal phenyl which may or may not be ring substituted with one or more alkyl, alkoxy, halogen, nitro, cyano, and carboalkoxy groups; and X is an anion of a strong acid, and compounds of the formula (II):

$$[(R_2NZ)_3N]^+ + X^- \qquad (II)$$

wherein R is an alkyl group of about 1 to about 6 carbon atoms; Z is a divalent phenyl which may or may not be ring substituted with one or more alkyl, alkoxy, halogen, nitro, cyano, and carboalkoxy groups; and X is an anion of a strong acid;
(b) a carrier vehicle comprising a copolymer formed by polymerization of:
  (i) about 45% to about 55% by weight butyl acrylate,
  (ii) about 38% to about 45% by weight methylmethacrylate,
  (iii) about 4% to about 10% by weight hydroxyethylmethacrylate,
  (iv) about 0% to about 8% by weight methacrylic acid, and
  (v) about 0% to about 2% by weight acrylic acid; and
(c) a solvent system.

16. The liquid composition for coating surfaces of claim 15, wherein the near infrared absorbing agent is present in an amount of about 0.01% to about 2% by weight of the composition; the carrier vehicle is present in an amount of about 20% to about 60% by weight of the composition; and the solvent system is present in an amount of about 40% to about 80% by weight of the composition.

17. A liquid composition for coating surfaces comprising,
(a) a near infrared absorbing agent selected from the group consisting of compounds of the formula (I):

$$[(R_2NZ)_2N{=}Z'{=}NR_2]^{2+} + 2X^- \qquad (I)$$

wherein R is an alkyl group of about 1 to about 6 carbon atoms; Z is a divalent phenyl which may or may not be ring substituted with one or more alkyl, alkoxy, halogen, nitro, cyano, and carboalkoxy groups; Z' is a quinoidal phenyl which may or may not be ring substituted with one or more alkyl, alkoxy, halogen, nitro, cyano, and carboalkoxy groups; and X is an anion of a strong acid, and compounds of the formula (II):

$$[(R_2NZ)_3N]^+ + X^- \qquad (II)$$

wherein R is an alkyl group of about 1 to about 6 carbon atoms; Z is a divalent phenyl which may or may not be ring substituted with one or more alkyl, alkoxy, halogen, nitro, cyano, and carboalkoxy groups; and X is an anion of a strong acid;
(b) a carrier vehicle comprising a copolymer formed by polymerization of:
  (i) about 40% to about 70% by weight methylmethacrylate,
  (ii) about 10% to about 30% by weight ethylacrylate,
  (iii) about 20% to about 30% by weight dimethylaminoethylmethacrylate, and
(c) a solvent system.

* * * * *